C. E. BEACH.
BATTERY CHARGING SYSTEM.
APPLICATION FILED AUG. 2, 1913.

1,121,892.

Patented Dec. 22, 1914.

2 SHEETS—SHEET 1.

WITNESSES:
R. C. Palmpatier
M. L. Thomas

INVENTOR
C. E. Beach

C. E. BEACH.
BATTERY CHARGING SYSTEM.
APPLICATION FILED AUG. 2, 1913.

1,121,892.

Patented Dec. 22, 1914.
2 SHEETS—SHEET 2.

WITNESSES:
R. C. Palmatier
M. L. Thomas

INVENTOR
C. E. Beach

UNITED STATES PATENT OFFICE.

CLARENCE E. BEACH, OF BINGHAMTON, NEW YORK, ASSIGNOR TO GEORGE O. KNAPP, OF NEW YORK, N. Y.

BATTERY-CHARGING SYSTEM.

1,121,892.   Specification of Letters Patent.   Patented Dec. 22, 1914.

Application filed August 2, 1913. Serial No. 782,731.

*To all whom it may concern:*

Be it known that I, CLARENCE E. BEACH, of Binghamton, in the county of Broome and State of New York, have invented certain new and useful Improvements in Battery-Charging Systems, of which the following is a specification.

My invention relates to electric systems and particularly to battery charging systems in which it is desirable that the charging time be automatically controlled.

The invention can be used to control any connection of a supply circuit to a receiving circuit whenever it is desired to automatically open such connection at the end of a measured time of energized connection, whether such measured time has been continuous or has been made up of two or more separate periods.

It will be noticed that the system has been so developed that a standard time circuit may be used without departing from the spirit of the invention.

Among the important objects of the invention are to provide improved time setting mechanism for determining the length of time during which a battery is to be charged; to provide electromagnetic cutout mechanism and a cut-out circuit therefor controlled by the time setting mechanism for effecting opening of the supply circuit after the lapse of the time period for which the time setting mechanism was set; to provide improved electromechanical means for effecting gradual restoration of the time setting mechanism to normal position after setting thereof; to provide an electrical impulse circuit for said electromechanical restoring mechanism controlled primarily by the charging circuit and periodically by clock mechanism; to provide clock mechanism which is effective at all times as a time piece for indicating the time and which periodically actuates contacts for controlling the impulse circuit; and in general to provide improved arrangement in a battery charging system in which timing mechanism may be set for a certain charging period and in which the supply circuit is automatically opened after lapse of the time for which setting was made.

By referring to the accompanying drawings forming part of this specification, the nature of the invention can be fully understood.

Figures 1, 2:
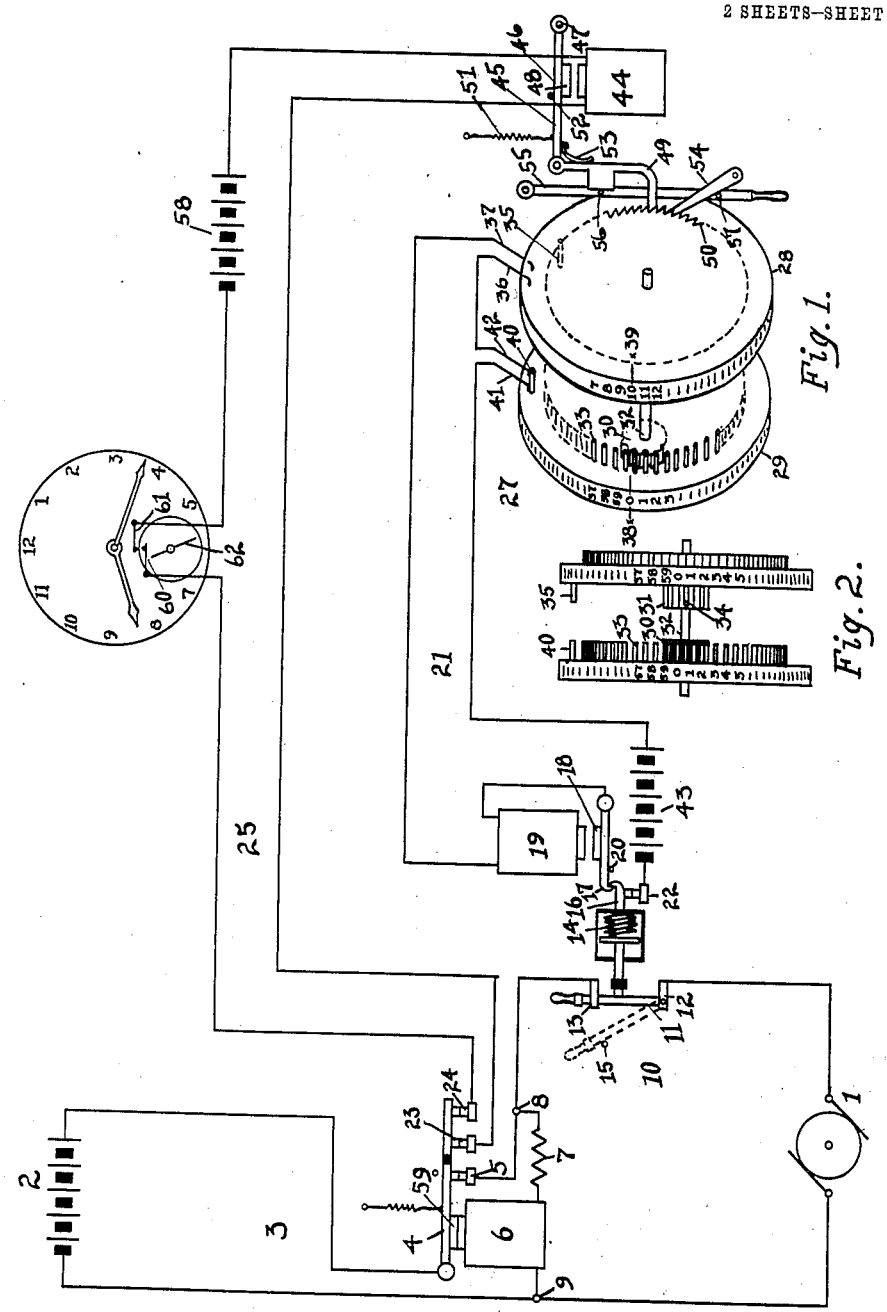
Figure 3:
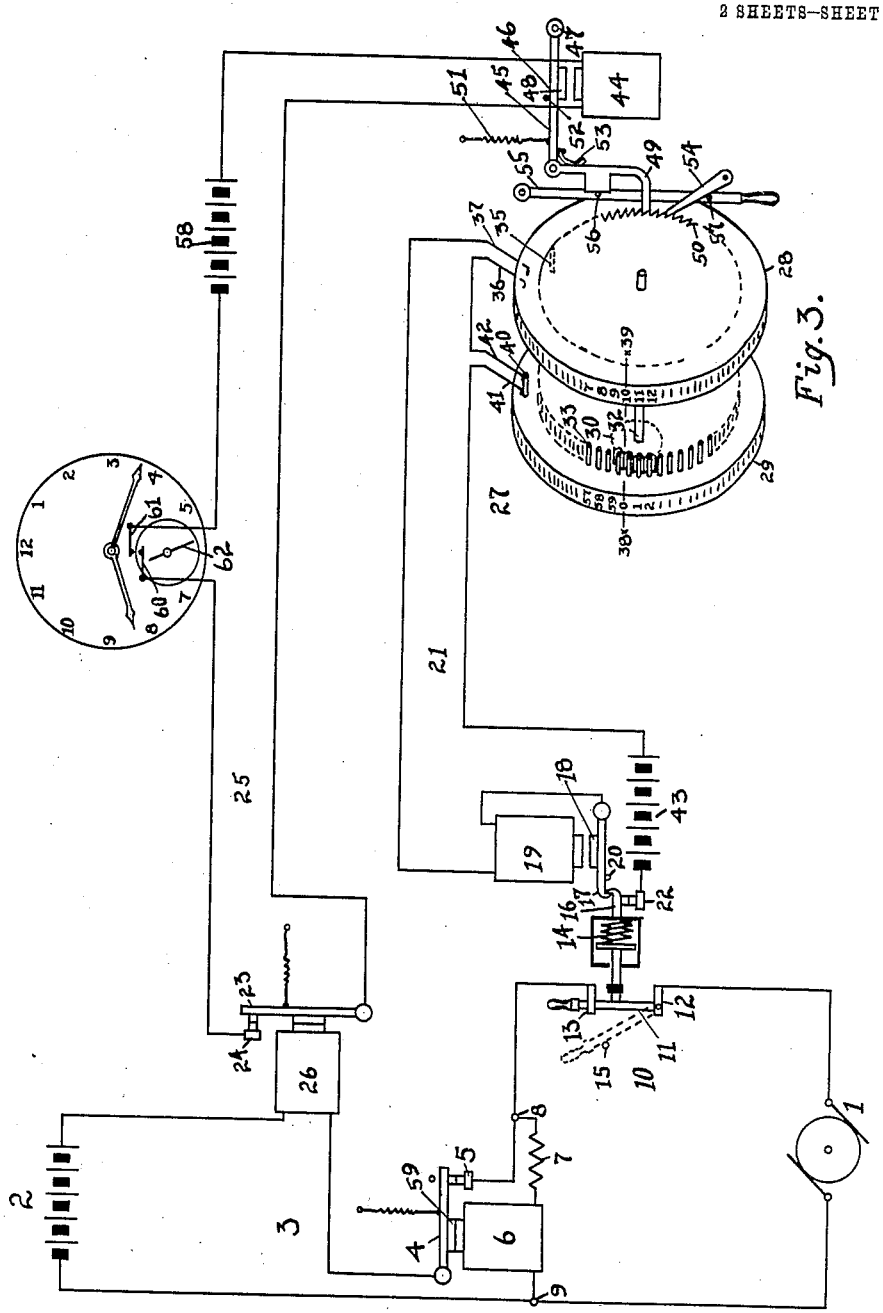

In these drawings, Figure 1 diagrammatically illustrates various controlling mechanisms and connecting circuits, Fig. 2 is a front elevational view of the setting members, and Fig. 3 is an alternative method of controlling the circuits of Fig. 1.

In my improved system a source of current 1 is provided for supplying charging current for the storage batteries 2, a charging circuit 3 being provided for connecting the source with the battery. This circuit passes through the switch arm 4 and contact 5 of the electromagnetic switch under the control of magnet 6. The magnet 6 is connected in series with a resistance 7 between terminals 8 and 9. A switch 10 is provided for controlling the electromagnet and the charging circuit, this switch being shown as comprising a switch blade 11 pivoted to the contact 12 and adapted for connection with the contact jaw 13, a spring 14 tending to hold the switch blade in open position against the stop 15. In mechanical contact with the switch blade is a throwout arm 16 adapted for latching engagement with the latch 17, this latch carrying an armature 18 for coöperating with the cut-out electromagnet 19. While this magnet is deënergized the latch 17 will be down against its stop 20 so that its end may receive and enter into engagement with the end of the throwout arm 16 when the switch 10 is closed so that the switch will remain closed during such latching engagement. This construction permits manual opening of the switch 10 whenever desired. Upon energization of the cut-out electromagnet the latch 17 will be raised to release the throwout arm 16 and the spring 14 will then operate the switch 10 to thereby open the charging circuit. When latch 17 is lifted, the cutout circuit 21 is opened by the removal of throwout arm 16 from between the latch 17 and the contact 22. If the switch 10 should be closed with the time setting mechanism in the normal position, the circuit 21 would be completed and magnet 19 would lift the latch 17, releasing the throwout arm and breaking its own circuit 21. If the switch is held in the closed position the consequent falling of latch 17 would again close the circuit and this "buzzer" action thus produced would be an indication that the time setting mechanism was not set.

Two contacts 23, 24 in the impulse circuit 25 are controlled by the switch 10, either through the operation of magnet 6 as in Fig. 1, or through the operation of magnet 26 connected in series in the charging circuit, as in Fig. 3.

The circuit 21 controlling the cut-out electromagnet 19 is controlled by a suitable time setting mechanism 27. The general construction and arrangement of the time setting mechanism is such that when this mechanism is adjusted to an abnormal position the cut-out circuit 21 will be open and will not again be closed until the setting mechanism is brought back to normal position. The mechanism shown comprises two number wheels or disks 28 and 29, bearing on their peripheries numbers indicative of time. Connecting between these number wheels is suitable carry-over mechanism operating for the wellknown purpose of causing a partial rotation of one number wheel for each complete revolution of the other. As shown, the carry-over mechanism comprises two carry-over pinions 30 and 31 secured to a shaft 32 mounted in suitable bearings, not shown. Extending from the inner face of the number wheel 29 are a plurality of gear pins 33 with which the pinion 30 has gearing engagement. Projecting from the inner face of the number wheel 28 is a carry-over pin 34 which, once for each revolution of the wheel 28, will engage with the carry-over pinion 31 to cause sufficient rotation of this pinion and of pinion 30 to effect a partial rotation of the number wheel 29 corresponding to the distance between adjacent indicating numbers on this wheel. As indicated, the number wheel 28 has on its periphery the numbers zero to fifty-nine, representative of minutes, and the number wheel 29 likewise bears on its periphery the numbers zero to fifty-nine, but indicative of hours. The wheel 28 has near its periphery a contact pin 35 for engaging contact springs 36 and 37 when the zero indication on this wheel is at the line of sight 38—39. Number wheel 29 has a similar contact pin 40 for engaging contact springs 41 and 42 when the zero indication of this wheel is at the line of sight. The contact springs 36, 37 and 41, 42 are connected serially in the cut-out circuit 21 together with the source of current 43, and when both number wheels are at zero indication, the switch 10 being closed, the cut-out circuit will be closed and the cut-out electromagnet 19 will be energized to raise latch 17. If, however, any one of the number wheels has been set away from zero indication the cut-out circuit 21 will be open. As shown in Fig. 1 the hour wheel 29 is at zero indication but the minute wheel 28 has been set to the ten indication and its pin 35 has been moved away from contact springs 36 and 37 to thereby open the cut-out circuit. As soon as the minute wheel is restored to its normal position the cut-out circuit will again be closed at the setting mechanism.

I have shown electromechanical restoring mechanism for the time setting mechanism. This restoring mechanism comprises an electromagnet 44 and an armature structure 45 for coöperating with the time setting mechanism. This armature structure comprises a lever 46 pivoted at its end 47 and carrying the armature 48. Pivoted at its upper end to the inner end of the lever 46 is a ratchet arm 49 whose end coöperates with the teeth of a ratchet disk 50 secured to the minute wheel 28. The spring 51 tends to hold the lever 46 up against the stop 52 and a spring 53 bearing on the ratchet arm 49 tends to hold the end of this arm in engagement with the ratchet teeth. When a current impulse is sent through the electromagnet 44 the armature structure 45 will be moved about its pivot 47 and the ratchet wheel will be advanced to cause corresponding advancement of the minute wheel 28. The construction is preferably such that for each retraction of the armature structure 45 the minute wheel 28 will be given an angular advance equal to the distance between indicating numbers thereon so that sixty advancements will cause one complete revolution of the minute wheel. A detent pawl 54 engages with the ratchet disk 50 and coöperates with the ratchet arm 49 in a well-known manner. The arm 55 having mounted thereon the two pins 56 and 57 is suitably located in relation to the ratchet arm 49 and detent pawl 54 so that they can be disengaged from the ratchet disk 50 to make the setting of the time mechanism more convenient.

For supplying current impulses to the electromagnet 44, I provide the current impulse circuit 25 which includes a source of current 58 and which is primarily controlled by contacts 23, 24. In Fig. 1 these contacts are controlled directly by the magnet 6 which controls the charging circuit. When magnet 6 is energized, armature 59 is attracted, closing the charging circuit at 4, 5 and the impulse circuit at 23, 24, by means of a conducting strip mounted upon arm 4 but insulated therefrom, keeping both circuits closed as long as the potential between the terminals 8 and 9 is sufficient to hold magnet 6 fully energized. In Fig. 3, contacts 23, 24 are controlled by the magnet 26 which is energized whenever the battery 2 is being charged. The current impulses through the impulse circuit are controlled by contacts 60 and 61 with which clock mechanism is associated to periodically cause engagement of the contacts and closure of the impulse circuit and for each of these closures the restoring electromagnet 44 is energized and the time setting mechanism restored one step. As indicated in Fig. 1, an ordinary clock is provided for controlling the impulse circuit and has its second hand 62 adapted to coöperate once for each revolution with the contacts 60 and 61 so that the impulse circuit is closed once each minute. While these contacts are diagrammatically represented as being controlled by the second hand of the clock, such showing is intended to be merely typical, and any well known means may be employed for suitably operating the contacts 60 and 61, such as, for example, a cam on the second hand shaft.

Electromagnetic relay 6 is so proportioned as to release its armature upon a diminution of the current supply voltage to a point equal to the counter-electromotive force of the battery 2, thereby opening both the charging and impulse circuits, thus preventing the discharge of the battery into the supply circuit and the further restoring of the time setting mechanism until the supply circuit potential has again risen sufficiently to operate the relay which will again close the charging and impulse circuits.

The operation of the system is apparent from the above description. As shown in Fig. 1, the minute wheel has been set for the charging time of ten minutes. Such setting removed pin 35 from contacts 36 and 37 to open the cut-out circuit 21 so that the latch 17 will be down ready to receive the throwout arm 16 when the switch 10 is closed. Immediately upon closure of switch 10 the electromagnet 6 is energized and its armature attracted to close the charging circuit 3 and the impulse circuit 25. Now as the clock runs, its second hand 62 will once every minute close the impulse circuit for a short time and during each impulse the restoring electromagnet 44 is energized, and the armature structure 45 controlled thereby will be operated to restore the minute wheel one division toward normal. After ten minutes the minute number wheel will have advanced ten times and will be restored to zero indication and when such final restoration takes place the pin 35 will again be in engagement with contacts 36 and 37 to close the cut-out circuit. Upon such closure the electromagnet 19 will raise the latch 17 and, the switch 10 being opened, the magnet 6 will fail, disconnecting the battery 2 and opening the impulse circuit, so that there will be no further operation of the restoring electromagnet.

If it were desired to charge the battery for two hours and thirty minutes, the minute wheel would be set ahead to the thirty indication and the hour wheel would be set ahead to the two indication and upon such setting both pins 35 and 40 would be disconnected from their contact springs to open the cut-out circuit. When the switch 10 is then closed it will remain in closed position, and the impulse circuit will be primarily closed by the contacts 23, 24, and will thereafter be closed once each minute and the minute wheel will be restored step by step. After the minute wheel has been restored a half revolution, it will again indicate zero and its pin 35 will bridge contacts 36 and 37. However, as the pin 40 of the hour wheel 29 is away from its contact springs 41 and 42, the cut-out circuit will remain open and the restoring mechanism will continue to rotate the minute wheel. The minute wheel now makes one more step and between the indications zero and fifty-nine, the carry-over mechanism will become effective and will advance the hour wheel one division until this wheel indicates one. The pin 40 of the hour wheel still being away from the contact springs 41 and 42, the cut-out circuit still remains open and the minute wheel will continue for another revolution, at the end of which revolution the carry-over mechanism again operates and the hour wheel is advanced to zero indication. At one hour, zero minutes, the contact 41, 40, 42 is open and the contact 36, 35, 37 is closed, while at zero hours, 59 minutes, contact 41, 40, 42 is closed and contact 36, 35, 37 is open, and in order to keep the cut-out circuit open, it is necessary to so arrange the mechanism that the contact 36, 35, 37 on the minute wheel is broken in moving from zero to fifty-nine before the contact 41, 40, 42 on the hour wheel is closed in moving from one to zero. The minute wheel will now make another revolution, again returning to zero. Both wheels being now at zero, their pins will both engage with their respective contact springs and the cut-out circuit will be closed, such closure resulting in opening of the charging circuit and of the impulse circuit, as before described. The charging circuit is thus automatically opened and the setting mechanism automatically restored to normal after the charging period of two hours and thirty minutes.

I thus provide an improved battery charging controlling system in which accurate adjusting or setting for a desired charging time can be quickly made and in which the charging circuit is automatically opened at the end of the predetermined charging time period.

I do not desire to be limited to the precise construction or arrangement shown and described, as changes and modifications are possible which will still come within the scope of the invention.

The use of a battery charging system embodying means for operating cut-out mechanism upon zero indication and for operating said cut-out mechanism and for controlling the restoration of the time indicating means whenever a predetermined condition of the supply circuit is obtained, is not broadly claimed herein, as same forms the subject matter of my co-pending application, Serial No. 787,608, filed September 2, 1913, but

What I claim herein and desire to secure by Letters Patent of the United States is:

1. In a storage battery system, the combination of a supply circuit, a charging circuit, two cut-out mechanisms therefor, means for indicating a desired length of time of charge, means for operating one of said cut-out mechanisms upon zero indication, means for restoring said indicating means toward zero indication as the time of charging elapses, and means controlled by said supply circuit for operating the other of said cut-out mechanisms whenever a predetermined condition of the supply circuit is obtained.

2. In a storage battery system, the combination of a supply circuit, a charging circuit, two cut-out mechanisms therefor, means for indicating a desired length of time of charge, means for operating one of said cut-out mechanisms upon zero indication, means controlled by said supply circuit for operating the other of said cut-out mechanisms whenever a predetermined condition of the supply circuit is obtained, mechanism for restoring said indicating means toward zero indication as the time of charging elapses and a time-controlled electromagnet controlling said restoring mechanism.

3. In a storage battery system, the combination of a supply circuit, a charging circuit, two cut-out mechanisms therefor, means controlled by said supply circuit for operating one of said cut-out mechanisms whenever a predetermined condition of the supply circuit is obtained, means for indicating a desired length of time of charge, means for operating the other of said cut-out mechanisms upon zero indication, mechanism for restoring said indicating means toward zero indication as the time of charging elapses, an electromagnet controlling said restoring mechanism and a time circuit therefor.

4. In a storage battery system, the combination of a supply circuit, a charging circuit, two cut-out mechanisms therefor, means for indicating a desired length of time of charge, means for operating one of said cut-out mechanisms upon zero indication, mechanism for restoring said indicating means toward zero indication as the time of charging elapses, an electromagnet controlling said restoring mechanism, a time impulse circuit therefor, means energized by said supply circuit for controlling the operativeness of said restoring mechanism, and means for operating the other of said cut-out mechanisms whenever a predetermined condition of the supply circuit is obtained.

5. In a storage battery system, the combination of a charging circuit, a switch for said circuit, mechanism for opening said switch, means for indicating a desired length of time of charge, and a connection between said indicating means and said switch opening mechanism adapted to disclose the condition of the indicating means upon closure of the switch and to cause opening of said switch upon zero indication.

6. In an electrical system, the combination of a charging circuit including a storage battery, a source of current, a switch for said circuit, means for opening said switch, means for indicating a desired length of time of charge, means for operating said switch opening means upon zero indication, mechanism for restoring said indicating means toward zero indication as the time of charging elapses, an operating electromagnet for said restoring mechanism, a time impulse circuit therefor, an electromagnet connected to said charging circuit, a switch for said charging circuit controlled by said electromagnet and contacts in said impulse circuit controlled by said electromagnet.

7. In a storage battery system, the combination of a supply circuit, a charging circuit, means for indicating a desired length of time of charge, means for restoring said indicating means toward zero indication, a switch adapted to break said charging circuit, a spring operated throw-out member tending to open said switch, a releasing latch adapted to engage with said throw-out member and hold said member against said tendency, a magnet adapted to operate said releasing latch, contacts adapted to be closed by said indicating means upon zero indication, a circuit for said magnet including in series therein said contacts associated with said indicating means, said magnet, said releasing latch, and said throw-out member and means controlled by said supply circuit for opening said charging circuit and for stopping said restoration whenever a predetermined condition of the supply circuit is obtained.

8. In a storage battery system, the combination of a supply circuit, a charging circuit, means for indicating a desired length of time of charge, means for restoring said indicating means toward zero indication, a switch adapted to break said charging circuit, a spring operated throw-out member tending to open said switch, a releasing latch adapted to engage with said throw-out member and hold said member against said tendency, a magnet adapted to operate said releasing latch, a circuit for said magnet controlled jointly by said indicating means and the engagement of said throw-out member and said releasing latch, and means controlled by said supply circuit for opening said charging circuit and for stopping said restoration whenever a predetermined condition of the supply circuit is obtained.

In witness whereof, I hereunto subscribe my name, this 31st day of July, A. D., 1913.

CLARENCE E. BEACH.

Witnesses:
   W. R. GOUDY,
   C. M. CONNERTON.